United States Patent
Aytekin et al.

(10) Patent No.: US 12,142,014 B2
(45) Date of Patent: Nov. 12, 2024

(54) METHOD, AN APPARATUS AND A COMPUTER PROGRAM PRODUCT FOR VIDEO ENCODING AND VIDEO DECODING

(71) Applicant: Nokia Technologies Oy, Espoo (FI)

(72) Inventors: Caglar Aytekin, Tampere (FI); Francesco Cricri, Tampere (FI); Mikko Honkala, Espoo (FI)

(73) Assignee: Nokia Technologies Oy, Espoo (FI)

( * ) Notice: Subject to any disclaimer, the term of this patent is extended or adjusted under 35 U.S.C. 154(b) by 692 days.

(21) Appl. No.: 17/430,987

(22) PCT Filed: Jan. 29, 2020

(86) PCT No.: PCT/FI2020/050044
§ 371 (c)(1),
(2) Date: Aug. 13, 2021

(87) PCT Pub. No.: WO2020/165490
PCT Pub. Date: Aug. 20, 2020

(65) Prior Publication Data
US 2022/0164995 A1 May 26, 2022

(30) Foreign Application Priority Data
Feb. 15, 2019 (FI) .................................. 20195114

(51) Int. Cl.
*G06T 9/00* (2006.01)
*G06N 3/08* (2023.01)
(Continued)

(52) U.S. Cl.
CPC .............. *G06T 9/002* (2013.01); *G06N 3/08* (2013.01); *H04N 19/132* (2014.11); *H04N 19/15* (2014.11); *H04N 19/196* (2014.11)

(58) Field of Classification Search
CPC .......... G06T 9/002; G06N 3/08; G06N 3/045; G06N 3/047; H04N 19/132; H04N 19/15; H04N 19/196; H04N 19/48; H04N 19/42
See application file for complete search history.

(56) References Cited

U.S. PATENT DOCUMENTS

| | | | |
|---|---|---|---|
| 2018/0174047 A1 | 6/2018 | Bourdev et al. | ........... 3/8 |
| 2018/0176570 A1 | 6/2018 | Rippel et al. | |
| 2021/0335017 A1* | 10/2021 | Covell | ........... H04N 19/00 |

FOREIGN PATENT DOCUMENTS

| | | |
|---|---|---|
| CN | 107688850 A | 2/2018 |
| CN | 107689224 A | 2/2018 |
| WO | 2018/213499 A1 | 11/2018 |

OTHER PUBLICATIONS

Extended European Search Report received for corresponding European Patent Application No. 20755978.2, dated Oct. 7, 2022, 14 pages.

(Continued)

*Primary Examiner* — Molly Wilburn
(74) *Attorney, Agent, or Firm* — Joseph C. Drish; Harrington & Smith

(57) ABSTRACT

The embodiments relate to a method comprising compressing input data (I) by means of at least a neural network (E, 310); determining a compression rate for data compression; miming the neural network (E, 310) with the input data (I) to produce an output data (c); removing a number of elements from the output data (c) according to the compression rate to result in a reduced form of the output data (me); and providing the reduced form of the output data (me) and the compression rate to a decoder (D, 320). The embodiments also relate to a method comprising receiving input data (me) for decompression; decompressing the input data (me) by means of at least a neural network (D, 320); determining a decompression rate for decompressing the (Continued)

input data (me); miming the neural network (D, 320) with input data (me) to produce a decompressed output data (î); padding a number of elements to the compressed input data (me) according to the decompression rate to produce an output data (î); and providing the output data (î).

18 Claims, 5 Drawing Sheets

(51) Int. Cl.
    *H04N 19/132*    (2014.01)
    *H04N 19/15*    (2014.01)
    *H04N 19/196*    (2014.01)

(56) References Cited

OTHER PUBLICATIONS

Mentzer et al., "Conditional Probability Models for Deep Image Compression", arXiv, Jun. 4, 2019, pp. 1-19.
Wang, "Multi-path Convolutional Neural Networks for Complex Image Classification", arXiv, Jun. 15, 2015, pp. 1-8.
Bross et al., "Versatile Video Coding (Draft 3)", Joint Video Experts Team (JVET) of ITU-T SG 16 WP 3 and ISO/IEC JTC 1/SC 29/WG 11, JVET-L1001-v9, Oct. 3-12, 2018, 234 pages.
Toderici et al., "Variable Rate Image Compression with Recurrent Neural Networks", arXiv, Mar. 1, 2016, pp. 1-12.
Office action received for corresponding Finnish Patent Application No. 20195114, dated Sep. 17, 2019, 10 pages.
Wu et al., "Deep Compressive Autoencoder for Action Potential Compression in Large-Scale Neural Recording", arXiv, Sep. 17, 2018, pp. 1-19.
Theis et al., "Lossy Image Compression with Compressive Autoencoders", arXiv, Mar. 1, 2017, pp. 1-19.
Plaut, "From Principal Subspaces to Principal Components with Linear Autoencoders", arXiv, Dec. 28, 2018, pp. 1-6.
Watkins et al., "Image Compression: Sparse Coding vs. Bottleneck Autoencoders", arXiv, Jan. 23, 2018, 4 pages.
Hinton et al., "Reducing the Dimensionality of Data with Neural Networks", Science, vol. 313, No. 5786, Jul. 28, 2006, pp. 504-507.
International Search Report and Written Opinion received for corresponding Patent Cooperation Treaty Application No. PCT/FI2020/050044, dated May 5, 2020, 15 pages.
Li et al., "Learning Convolutional Networks for Content-weighted Image Compression", arXiv, Sep. 19, 2017, 11 pages.
Mentzer, Fabian, et al., "Conditional Probability Models for Deep Image Compression", 2018 IEEE/CVF Conference on Computer Vision and Pattern Recognition, Dec. 16, 2018, pp. 4394-4402.

\* cited by examiner

METHOD, AN APPARATUS AND A COMPUTER PROGRAM PRODUCT FOR VIDEO ENCODING AND VIDEO DECODING

RELATED APPLICATION

This application was originally filed as PCT Application No. PCT/FI2020/050044, filed on Jan. 29, 2020, which claims priority from Finland Application No. 20195114, filed on Feb. 15, 2019, each of which is incorporated herein by reference in its entirety.

TECHNICAL FIELD

The present solution generally relates to neural networks.

BACKGROUND

Many practical applications rely on the availability of semantic information about the content of the media, such as images, videos, audio, etc. Semantic information may be represented by metadata which may express the type of scene, the occurrence of a specific action/activity, the presence of a specific object, etc. Such semantic information can be obtained by analyzing the media.

Recently, the development of various neural network techniques has enabled learning to recognize content directly from the raw data. Neural networks are computerized models that comprise an input layer and an output layer. In addition, the neural networks comprise layered units that from input data into data that is usable by the output layer.

SUMMARY

Now there has been invented an improved method and technical equipment implementing the method, for neural networks. Various aspects include a method, an apparatus, and a computer readable medium comprising a computer program stored therein, which are characterized by what is stated in the independent claims. Various embodiments are disclosed in the dependent claims.

According to a first aspect, there is provided a method comprising compressing input data by means of at least a neural network; determining a compression rate for data compression; running the neural network with the input data to produce an output data; removing a number of elements from the output data according to the compression rate to result in a reduced form of the output data; and providing the reduced form of the output data and the compression rate to a decoder.

According to a second aspect, there is provided a method comprising receiving input data for decompression; decompressing the input data by means of at least a neural network; determining a decompression rate for decompressing the input data; running the neural network with input data to produce a decompressed output data; padding a number of elements to the decompressed input data according to the decompression rate to produce an output data; and providing the output data.

According to a third aspect, there is provided an apparatus comprising means for compressing input data, wherein said means for compressing comprises at least a neural network; means for determining a compression rate for data compression; means for running the neural network with the input data to produce an output data; means for removing a number of elements from the output data according to the compression rate to result in a reduced form of the output data; and means for providing the reduced form of the output data and the compression rate to a decoder.

According to an embodiment, the compression rate is associated with a mask, based on which the number of elements are removed.

According to an embodiment, the neural network is trained with multiple masks associated with different compression rates.

According to an embodiment, each mask of the multiple masks include a pattern of N ones, where N is different for each compression rate.

According to an embodiment, first N elements of a dimension of the reduced form of the output data are equal to one and the rest of that dimension are equal to zero.

According to an embodiment, the apparatus further comprises means for selecting N randomly from a uniform distribution during training.

According to an embodiment, the apparatus further comprises means for selecting N randomly selected from a non-uniform distribution emphasizing different compression rates or ranges of compression rates.

According to an embodiment, the apparatus further comprises means for training the neural network with different values of N, and means for averaging losses associated with the different values of N for a weight update.

According to an embodiment, the apparatus further comprises means for training the neural network with different values of N, and means for weighting the losses based on an inverse frequency of elements of a code that are not removed during training.

According to an embodiment, the apparatus further comprises means for training the neural network with different values of N and having at least one fixed weight based on a value of N.

According to a fourth aspect, there is provided an apparatus comprising means for receiving input data for decompression; means for decompressing input data by means of at least a neural network; means for determining a decompression rate for data decompression; means for running the neural network with input data to produce a decompressed input data; means for padding a number of elements to the decompressed output data according to the decompression rate to produce an output data; and means for providing the output data.

According to an embodiment, an apparatus comprises at least one processor, memory including computer program code.

DESCRIPTION OF THE DRAWINGS

In the following, various embodiments will be described in more detail with reference to the appended drawings, in which.

DESCRIPTION OF EXAMPLE EMBODIMENTS

In the following, several embodiments will be described in the context of neural networks. In particular, the several embodiments relate to neural video codec with varying bitrates. The present embodiments relate to a method to train a single neural network for different compression rates. The neural network is assumed to comprise at least two parts: an encoder network and a decoder network. Training this neural network for different compression rates can be done by masking different number of elements of the output of the encoder part during training phase and applying a particular mask at inference phase. A decoder is configured to pad the compressed data with zeros according to signaling information about the compression rate and/or the applied mask. The embodiments improve the technical field by providing a single neural network with different compression rates and sufficient quality instead of having multiple neural networks with different compressions rates. It is appreciated that the single neural network is communicated from neural encoder to neural decoder in more efficient manner than the multiple networks.

In this specification, terms "model" and "neural network" are used interchangeably, and also the "weights" of neural network can be referred to as "learnable parameters" or simply as "parameters".

Figure 1:
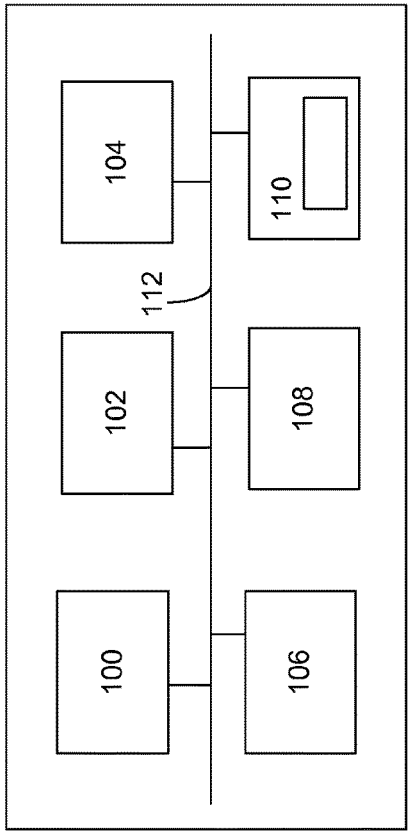
FIG. 1 shows an apparatus according to an embodiment.

FIG. 1 shows an apparatus according to present embodiments. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 1 comprises a main processing unit 100, a memory 102, a storage device 104, an input device 106, an output device 108, and a graphics subsystem 110, where are connected to each other via a data bus 112.

The main processing unit 100 is a processing unit arranged to process data within the data processing system. The main processing unit 100 may comprise or may be implemented as one or more processors or processor circuitry. The memory 102, the storage device 104, the input device 106, and the output device 108 may include other components as recognized by those skilled in the art. The memory 102 and storage device 104 store data in the data processing system 100. Computer program code resides in the memory 102 for implementing, for example, neural network training or other machine learning process. The input device 106 inputs data into the system while the output device 108 receives data from the data processing system and forwards the data, for example, to a display. While data bus 112 is shown as a single line, it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet table computer.

It needs to be understood that different embodiments allow different parts to be carried out in different elements. For example, various processes of the computer system may be carried out in one or more processing devices; for example, entirely in one computer device, or in one server device or across multiple user devices. The elements of machine learning process may be implemented as a software component residing on one device or distributed across several devices, as mentioned above, for example so that the devices form a so-called cloud.

A neural network (NN) is a computation graph that may comprise several layers of successive computation. A layer may comprise one or more units or neurons performing an elementary computation. A unit may be connected to one or more units, and the connection may have associated a weight. The weight may be used for scaling the signal passing through the associated connection. Weights may be learnable parameters, i.e., values which can be learned from training data. There may be other learnable parameters, such as those of batch-normalization layers.

Each layer is configured to extract feature representations from the input data. Features from lower layers represent low-level semantics (i.e. less abstract concepts, such as edges and texture), whereas higher layers represent higher-level semantics (i.e., more abstract concepts, like scene class). Unsupervised learning applications typically include pattern analysis and representation (i.e., feature) learning, whereas supervised learning applications may include classification of image objects (in the case of visual data).

Figure 2:
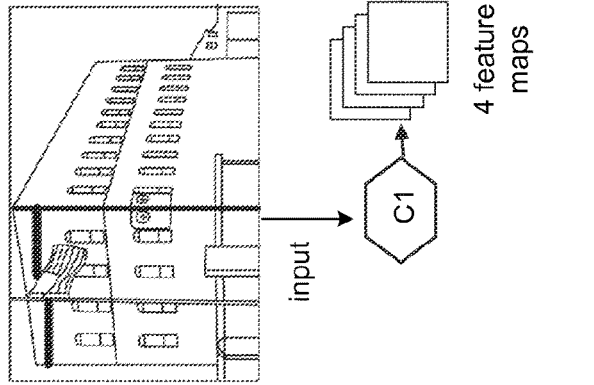
FIG. 2 shows an example of a convolutional neural network.

FIG. 2 shows an example of a neural network, a Convolutional Neural Network (CNN). This example of a CNN comprises one or more convolutional layers, fully connected layers, and a classification layer on top. CNNs are relatively easy to train compared to other deep neural networks and have fewer parameters to be estimated. Therefore, CNNs are highly attractive architecture to use, especially in image and speech applications.

In the example of FIG. 2, the input to a CNN is an image, but any other data could be used as well. Each layer of a CNN represents a certain abstraction (or semantic) level, and the CNN extracts multiple feature maps. A feature map may for example comprise a dense matrix of Real numbers representing values of the extracted features. The CNN in FIG. 2 has only three feature (or abstraction, or semantic) layers C1, C2, C3 for the sake of simplicity, but CNNs may have more than three convolution layers.

The first convolution layer C1 of the CNN may comprise extracting 4 feature-maps from the first layer (i.e. from the input image). These maps may represent low-level features found in the input image, such as edges and corners. The second convolution layer C2 of the CNN, which may extract 6 feature-maps from the previous layer, increases the semantic level of the extracted features. Similarly, the third convolution layer C3 may represent more abstract concepts found in images, such as combinations of edges and corners, shapes, etc. The last layer of the CNN, referred to as fully connected Multi-Layer Perceptron (MLP) may include one or more fully-connected (i.e., dense) layers and a final classification layer. The MLP uses the feature-maps from the last convolution layer in order to predict (recognize) for example the object class. For example, it may predict that the object in the image is a house.

A feed-forward NN and recurrent NN represent examples of neural network architectures. Feed-forward neural networks do not have a feedback loop: each layer takes input from one or more of the layers before and provides an output as the input for one or more of the subsequent layers. Also, units inside a certain layers may take input from units in one or more of the preceding layers and provide output to one or more of the following layers.

Initial layers (i.e. those close to the input data) extract semantically low-level features such as edges and textures in images, and intermediate and final layers extract more high-level features. After the feature extraction layers, there may be one or more layers performing a certain task, such as classification, semantic segmentation, object detection, denoising, style transfer, super-resolution, etc.

In a recurrent network, there is a feedback loop, so that the network becomes stateful, i.e., it is able to memorize information or a state.

Neural networks are being utilized in an ever increasing number of applications for many different types of device, such as mobile phones. Examples include image and video analysis and processing, social media data analysis, device usage data analysis, etc.

In order to configure a neural network to perform a task, an untrained neural network model has to go through a training phase. The training phase is the development phase, where the neural network learns to perform the final task. A training data set that is used for training a neural network is supposed to be representative of the data on which the neural network will be used. During training, the neural network uses the examples in the training dataset to modify its learnable parameters (e.g., its connections' weights) in order to achieve the desired task. Input to the neural network is the data, and the output of the neural network represents the desired task. For example, in the case of classification of objects in images, the output of the neural network can be used to derive a class or category index which indicates the class or category that the object in the input image belongs to. Training may happen by minimizing or decreasing the output's error, also referred to as the loss. Examples of the losses are mean squared error, cross-entropy, etc. In recent deep learning techniques, training is an iterative process, where at each iteration, the algorithm modifies the weights of the neural network to make a gradual improvement of the network's output, i.e., to gradually decrease the loss.

After training, the trained neural network model is applied to new data during an inference phase, in which the neural network performs the desired task to which it has been trained for. The inference phase is also known as a testing phase. As a result of the inference phase, the neural network provides an output which is a result of the inference on the new data. For example, the result can be a classification result or a recognition result.

Training can be performed in several ways. The main ones are supervised, unsupervised, and reinforcement training. In supervised training, the neural network model is provided with input-output pairs, where the output may be a label. In unsupervised training, the neural network is provided only with input data (and also with output raw data in case of self-supervised training). In reinforcement learning, the supervision is sparser and less precise; instead of input-output pairs, the neural network gets input data and, sometimes, delayed rewards in the form of scores (E.g., −1, 0, or +1). The learning is a result of a training algorithm, or of a meta-level neural network providing the training signal. In general, the training algorithm comprises changing some properties of the neural network so that its output is as close as possible to a desired output.

Training a neural network is an optimization process, but the final goal may be different from the goal of optimization. In optimization, the goal is to minimize a functional. In machine learning, the goal of optimization or training process is to make the model learn the properties of the data distribution from a limited training dataset. In other words, the goal is to learn to use a limited training dataset in order to learn to generalize to previously unseen data, i.e., data which was not used for training the model. This may be referred to as generalization. In practice, data may be split into at least two datasets, the training set and the validations et. The training set is used for training the network, i.e., to modify its learnable parameters in order to minimize the loss. The validation set is used for checking the performance of the network on data which was not used to minimize the loss, as an indication of the final performance of the network on data which was not used to minimize the loss, as an indication of the final performance of the model. In particular, the errors on the training set and on the validation set are monitored during the training process to understand the following things:

If the network is learning at all, in this case, the training set error should decrease, otherwise the model is in the regime of underfitting.

If the network is learning to generalize—in this case, also the validation set error needs to decrease and to be not too much higher than the training set error. If the training set error is low, but the validation set error is much higher than the training set errors, or it does not decrease of it even increases, the model is in the regime of overfitting. This means that the model has just memorized the training set's properties and performs well only on that set but performs poorly on a set not used for tuning its parameters.

Application of machine learning, in particular deep neural networks to image/video compression recently gained attention due to powerful learning abilities of deep neural networks.

In machine learning approach to video compression, there may be one neural network performing the compression of the input data to a new representation (e.g., a vector or tensor), that is referred to as the "code", which uses less bits of information and thus allows a lower bit rate or file size. The code can be decoded by another neural network which reconstructs an approximation of the original data input to the first neural network. The first neural network may be referred to as the "neural encoder" or "compressor" or "neural compressor", and the second neural network may be referred to as the "neural decoder" or "decompressor" or "neural decompressor".

An example of neural encoder/decoder implementation uses neural auto-encoders where the input image/video is encoded to a code of fixed length by the encoder part and the neural decoder part recovers the input signal from the code. An issue with this implementation is that it is not possible to tune a specified bitrate/accuracy. A neural encoder may have parameters to tune such that one can achieve various bitrates with corresponding accuracies. The desired bitrate/accuracy can be given as input to the neural decoder.

In another example, the image is encoded/decoded with one neural network, and where a residual image (i.e. difference between the original and reconstructed image) is encoded/decoded with another neural network. One limitation of this approach is that multiple neural networks are used for each neural encoder/decoder, therefore in order to achieve higher bitrates, the size of the neural decoder in terms of memory requirements, increases.

The present embodiments are targeted to achieve a variable bitrate with neural networks using a single neural network during training and inference. This is achieved by fixing the neural network structure and then training the neural network by an additional masking layer which randomly masks out portions of the code in a structured manner such that the neural decoder learns to recover the signal from a part of the code only.

The present embodiments are related to a use of neural networks for compressing and decompressing data, i.e.

neural compressor (i.e. neural encoder) and neural decompressor (i.e. neural decoder). The present embodiments are discussed with reference to video compression, but it is appreciated that the teachings of the solution can be applied for compressing other types of data as well, such as images, audio, text, other sensors' data, etc.

Figure 3:
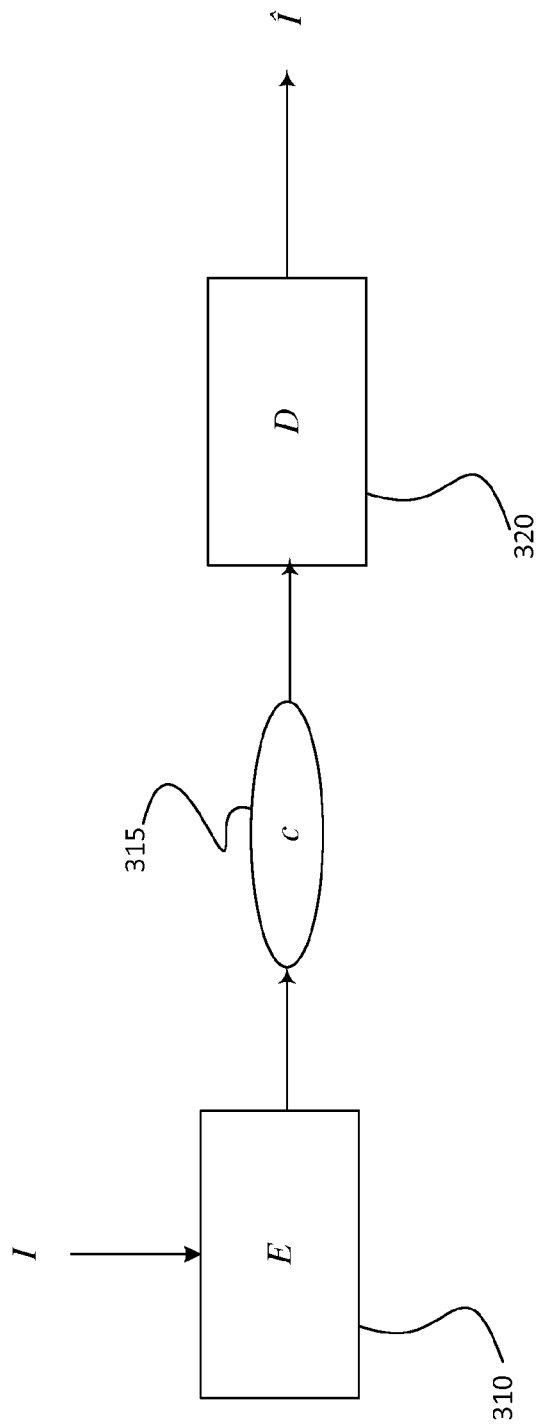
FIG. 3 shows a system according to an embodiment.

FIG. 3 illustrates an embodiment of a system. In the following description and FIG. 3, E refers to the neural encoder 310, I is the input signal (for example an image or a video or any other type of data) to the neural encoder 310, and c=E(I) is the output code 315 of the neural encoder 310 corresponding to the input I. Neural decoder 320 is denoted with D and Î=D(c) is the reconstructed signal where the input is the code.

The neural encoder 310 may comprise convolutional layers, non-linear activations and other neural network layers. For example, a neural network 310 can use convolutional layers with 4×4 filter (also known as "kernel") size and stride 2 which will halve the signal resolution, i.e. a stride is the amount by which the filter shifts.

Consecutive to this convolution layer, there may be an activation layer of leaky rectified linear unit ("lrelu") which passes the positive part of the signal directly and suppresses the negative layer by multiplying by a value between 0 and 1 (such as 0.2). For example, 3 consecutive convolutional-lrelu layers may reduce the resolution by 8 in all dimensions. In the example of FIG. 3, if the input signal I is a video with 240×240×32×3 (width, height, frames and channels respectively) the encoded signal c can be a representation of size 30×30×4×F where F is the number of filters used in the final convolutional layer of the neural encoder 310.

The neural decoder 320 may comprise deconvolutional layers and activations. For example, a neural decoder 320 can use deconvolutional layer with 4×4 filter (also known as "kernel") size and stride 2, which will upsample the signal resolution by 2. Consecutive to this deconvolutional layer, there may be an activation layer of leaky rectified linear unit ("lrelu") as described above. For example, 3 consecutive deconvolutional lrelu layers may upsample the resolution by 8 in all dimensions. With the example of FIG. 3, if the code c is of size 30×30×4×F, the decoded signal Î can be a representation of size 240×240×32×3.

When a neural network model, such as the one shown in FIG. 3, is being designed, the number of filters F may be selected as a high value such as 256 so that dimensionality of the input signal will be equal to the code with the above example, which means that there is no dimensionality reduction.

The designed neural network model, comprising a neural encoder 310 and a neural decoder 320, may be trained end-to-end by using samples from a video dataset, with a reconstruction error such as mean squared error (MSE) or the L1 loss (Least Absolute Deviations, "LAD"). L1 loss refers to an output of L1 loss function that is used to minimize an error which is the sum of all absolute differences between the true value and the predicted value. Other suitable errors (also referred to as "losses") can be used too, such as those derived from the output of another neural network. One example of such a loss is the so called "VGG loss" or "perceptual loss", where first a neural network is pre-trained on a certain dataset with a certain loss which allows the neural network to learn to extract good features from the data (such as with a classification loss); then, the pre-trained neural network may be used to extract features from both the output of the neural decoder and from the original data input to the neural encoder, and a distance function may be computed between these two sets of features (such as the mean squared error). Another example, which uses another neural network for computing a loss is based on the so-called adversarial training, where a neural network referred to as the discriminator is trained simultaneously with the neural encoder and neural decoder. The discriminator takes in either the output of the neural decoder or a sample from the uncompressed dataset, and outputs a value which represents the probability that the input data is sampled from the uncompressed dataset. This value may be used to derive a loss function for training both the discriminator and the neural encoder and neural decoder: Different variants of adversarial training exist, meaning that the present embodiments are not limited to any specific variant, but any of them can be used in the present solution. Furthermore, different losses can be combined, for example using a linear combination. Also, a loss may have additional terms such a regularization terms, needed for example to reduce overfitting of the model to the training data.

Figure 4:
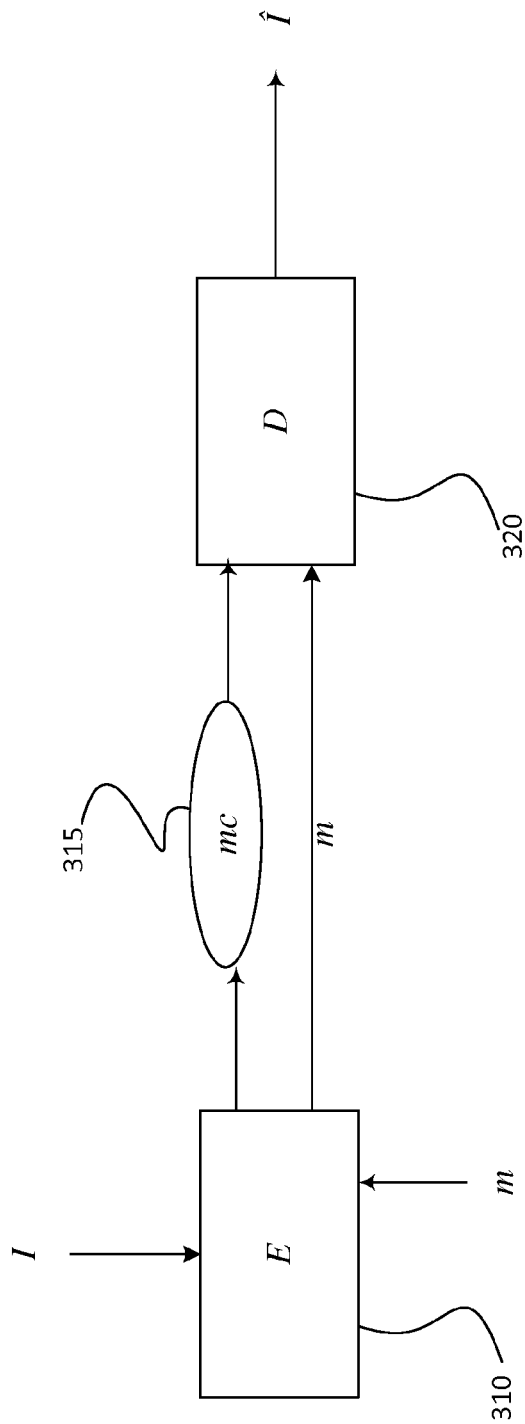
FIG. 4 shows a system according to an embodiment during training.

FIG. 4 illustrates the system of FIG. 3 at a training phase. During training of the neural network, a masking layer is provided to the encoder E, which applies mask m to code c. For example, the encoder may multiply the mask m with the code c in an element-wise manner. At each iteration, the mask m may be randomly generated such that m(:,:,:,0: N−1)=1 and m(:,:,:,N:)=0. In other words, the first N elements of the mask at a voxel (which in this description refers to a feature vector corresponding to a point in the first three dimensions ($4^{th}$ dimension is regarded as the feature dimension)) is 1 and remaining elements are zero, where N is a random (or pseudo-random) number that may be generated from a uniform probability distribution in $[N_{min}, N_{max}]$. Instead of uniform distribution, it is also possible to have different types of probability distribution. For example, if one wants to simulate a certain mask structure, one can select a probability distribution that has high values in that mask structure.

In the above example, the first N elements of the mask includes ones, and the remaining elements are zero, meaning that first N elements are kept, and the remaining elements are set to zero, which simulates training with a fixed N encoding dimension. It is appreciated that it is also possible to select different patterns for each N. For example, it is possible to have other mask structures, as long as these mask structures are fixed or the neural decoder is informed about the mask structure, for example by including an indication of a type of a mask or the mask structure in signaling information sent by the encoder device and received by the decoder device. However, having unstructured masks changes the order of the convolutions in the next layer to make the same effect with a structured mask.

During training, an iteration with random value N is applied to approximate a neural network training with encoding dimension N (F=N). At each iteration a different N may be sampled from the probability distribution and used for a training step, i.e., for updating the neural network. Hence, when the training is finished, one may end up with a single neural network which would approximate several neural networks trained with different number of filters, i.e. different F values.

The validation of the neural network model during training can be made in various ways. For example, the error at a deterministic mask with $N=N_{val}$ can be monitored during the training and the neural network model with lowest validation error can be selected as the best neural network model after training. This means that there is a single neural network model and during the training process, such neural network model is selected that gave the best performance.

Performance can be measured in terms of a representative mask. For example, if the training resembles fixed dimensionality trainings between 16 and 256 dimensions, it is possible that the performance of simulated 128 dimension training is checked and this can be a representative evaluation for all dimensions. It is also possible that different measures of validation accuracy are used to represent the accuracy of all simulated encoding dimensions, such as an average accuracy in all dimensions.

Instead of selecting the neural network model with lowest validation error as the best model, other options may include selecting couple of N values (or all values) and averaging or otherwise combining the errors. If a small number of N values is selected, in an embodiment, the selection may be done randomly at each validation phase.

During inference phase of the neural encoder, at first a certain encoding dimension N, that represents a compression rate (in particular, the dimension N may be inversely proportional to the compression rate), is determined or selected. The value of N can be e.g., 128 and the whole code can have dimensionality of 256. Then the output of the neural encoder is masked according to this value of the determined compression rate. This means that certain elements from the output data are removed according to said compression rate, which results in a reduced form of the output data. In this example, last 128 dimensions are discarded (i.e., 256-N). The neural encoder sends the number N to the neural decoder together with the remaining 128-dimensional vector. The neural decoder pads the received 128-dimensional vector with zeros according to N and calculates the output of padded vector.

Figure 5:
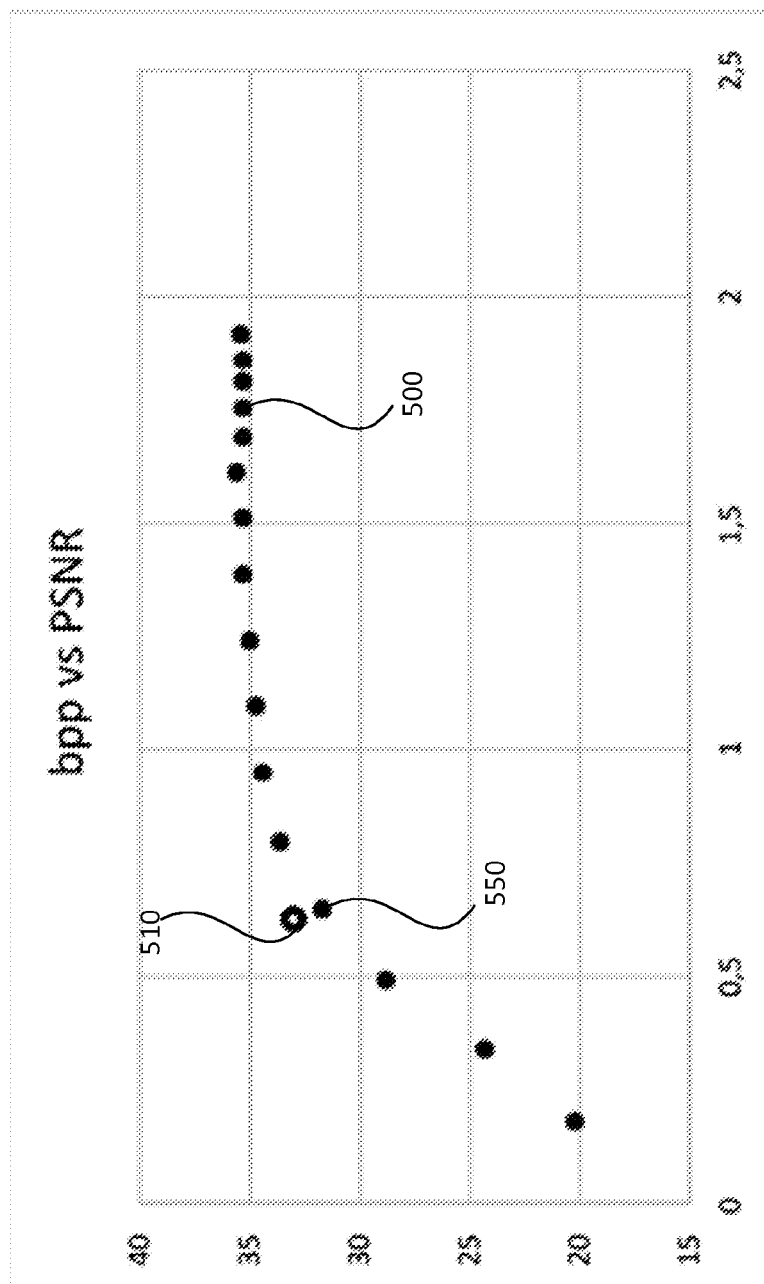
FIG. 5 shows an example of a bit-per-pixel versus peak signal-to-noise ratio plot obtained with neural network according to an embodiment.

FIG. 5 illustrates a resulting bit per pixel (bpp) versus peak signal-to-noise ratio (PSNR) plot obtained as described above with F=256, $N_{min}$=16, $N_{max}$=256 and $N_{val}$=128. The following table indicates the correspondence between the numbers and the point of the curve. The values at 64 encoding dimension are denoted with "#" for the present embodiments, and "*" for the network trained at fixed 64 encoding dimension. There's a minor performance degradation compared to having separate models for each compression rate; also, savings in memory size and required transmission capacity are significant because only a single network needs to be stored and transferred.

| | |
|---|---|
| 0.1849 | 20.2 |
| 0.342 | 24.3 |
| 0.4952 | 28.8 |
| 0.6445 (#) | 31.7 (#) |
| (0.6271 (*)) | (33.01 (*)) |
| 0.8012 | 33.6 |
| 0.9548 | 34.4 |
| 1.1 | 34.7 |
| 1.2382 | 35 |
| 1.3858 | 35.3 |
| 1.513 | 35.3 |
| 1.6128 | 35.6 |
| 1.6944 | 35.3 |
| 1.7591 | 35.3 |
| 1.8164 | 35.3 |
| 1.865 | 35.3 |
| 1.9127 | 35.4 |

Each point indicated with solid dots 500 in the curve corresponds to an encoding dimension N including 16, 256 and the values in between with 16 step size (i.e. 16, 32, 48, . . . , 224, 240, 256). The PSNR is measured as $$PSNR = 10\log\left(\frac{1}{MSE}\right)$$

and bitrate is measured as bit per pixel after entropy coding the masked code.

The unfilled dot 510 provided in the curve corresponds to the performance with a separate neural network trained with a fixed 64 dimensions and no masking applied. The closest solid dot 550 represents the performance obtained with the neural network trained with the method according to present embodiments and by using N=64 at inference time. The gap between the closest solid dot 550 and unfilled dot 510 represents the accuracy drop for the particular dimension. The accuracy drop is small when considering that our network can approximate the results of 240 (between 16 and 256) different neural networks. Hence, this results in saving 240× memory and time needed for training. In addition, sending the parameters of one network instead of 240 networks requires less bandwidth, memory and battery.

According to an embodiment, instead of randomly sampling the N, the network can be trained with all values of N (or e.g., a random subset of them) for every minibatch. The losses for the minibatches may be averaged or otherwise combined for the weight update. This means that in every single training iteration, it is made sure that the values simulate all the possible encoding dimensions. Otherwise, due to randomness, it may happen that in one iteration the network can only try to learn, for example, a very low encoding dimension and in another iteration, for example, a very high dimension, which may be suboptimal during training as they may go against each other. However, if in each iteration, the minibatch corresponding to data used in that iteration may contain all possible N values (note that there is no sampling form random distribution anymore), this may resolve the risk of "going against each other", and therefore may result in better simulating models. A minibatch may refer to a batch of data, where the size of the minibatch may range from 1 to M, where M is the size of the dataset. Similar effect can be achieved by computing multiple loss values (one for each value of N) for the whole minibatch and using the (potential weighted) average of the computed losses as the value to be optimized.

According to an embodiment, the subset of values of N is varied during training. For example, at the beginning N is the total number of elements in the output code (e.g., 256), so no elements are masked out. Later during training, the values of N can be in a limited subset, such as (assuming that code dimensionality is 256) 250, 251, 252, 253, 254, 255, 256. Later, the values of N can be in a slightly bigger subset, such as 240 to 256. The subset is incrementally populated with possible values for N, in such a way that the average value in the subset decreases. This way, training is easier at the beginning and harder towards the end, thus it is an implementation of so-called curriculum learning. This is one possible strategy where the subset of values of N is varied during training. Other similar strategies may be considered too.

According to an embodiment, the losses corresponding to different values of N may be weighted based on the inverse frequency of the elements of code c that are exposed. For instance, the first element of c is trained for every value of N and the last element of c is only trained when N gets the maximum value, and therefore it may be beneficial to weigh the loss corresponding to N=$N_{max}$, by multiplying it with f(N), where f is a function of N, such as e.g., N/$N_{max}$.

Exposed element(s) may refer to element(s) of the code that are not masked out during training. The frequency of the parts of the code that are not masked out may differ between parts of the code depending on the masking scheme.

According to an embodiment, some weights are held fixed based on the value of N that is used for that specific loss. For example, for a particular value of N there may be one or more predetermined weights, or other parameters, that may be kept fixed when training the neural network with the value of N. For another value of N, there may be another predetermined weight(s) that will be kept constant. Effectively this corresponds to training simultaneously multiple networks that have dedicated paths for dedicated values of N, while sharing some parts between the networks. This can be seen as a beneficial compromise to get a sufficient performance for a certain value of N while still having a single network. The exact parts of the networks that should be held fixed can be determined using validation error. I.e., different parts can be tried, and the validation error can be monitored. The set of parts held fixed which correspond to minimum validation error may then be chosen as the final set of parts held fixed.

At inference stage, a user may select the preferred dimensionality of the code so that a preferred bitrate is achieved. A low bitrate is achieved when the selected dimensionality is low, and a higher bitrate is achieved by increasing this dimensionality.

Figure 6:
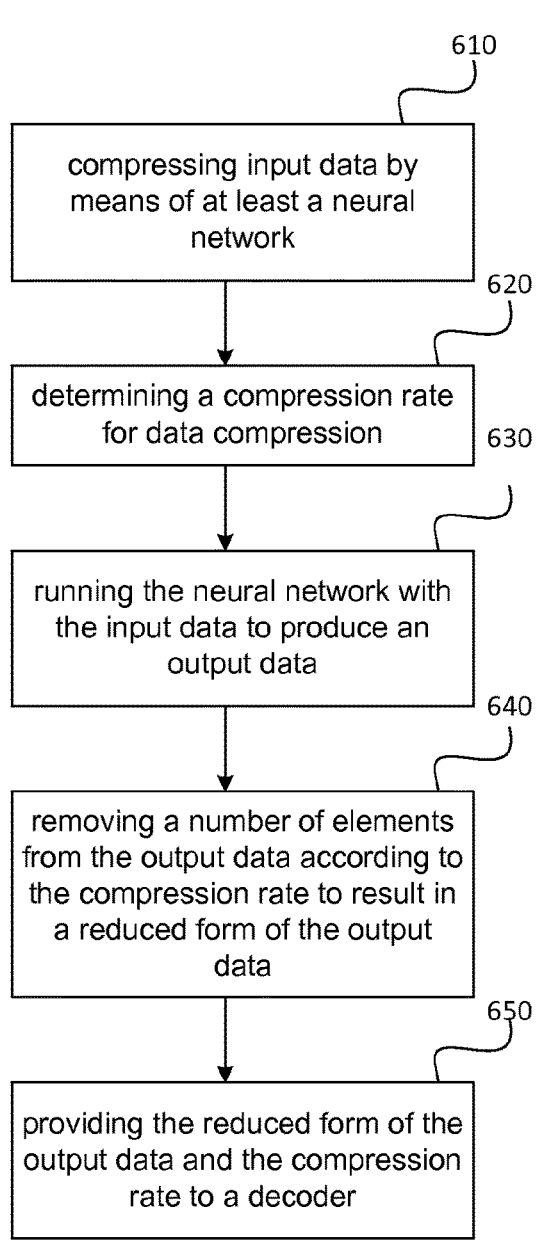
FIG. 6 is a flowchart illustrating a method according to an embodiment.

FIG. 6 is a flowchart illustrating a method according to an embodiment. A method comprises compressing 610 input data by means of at least a neural network; determining 620 a compression rate for data compression; running 630 the neural network with the input data to produce an output data; removing 640 a number of elements from the output data according to the compression rate to result in a reduced form of the output data; and providing 650 the reduced form of the output data and the compression rate to a decoder.

Figure 7:
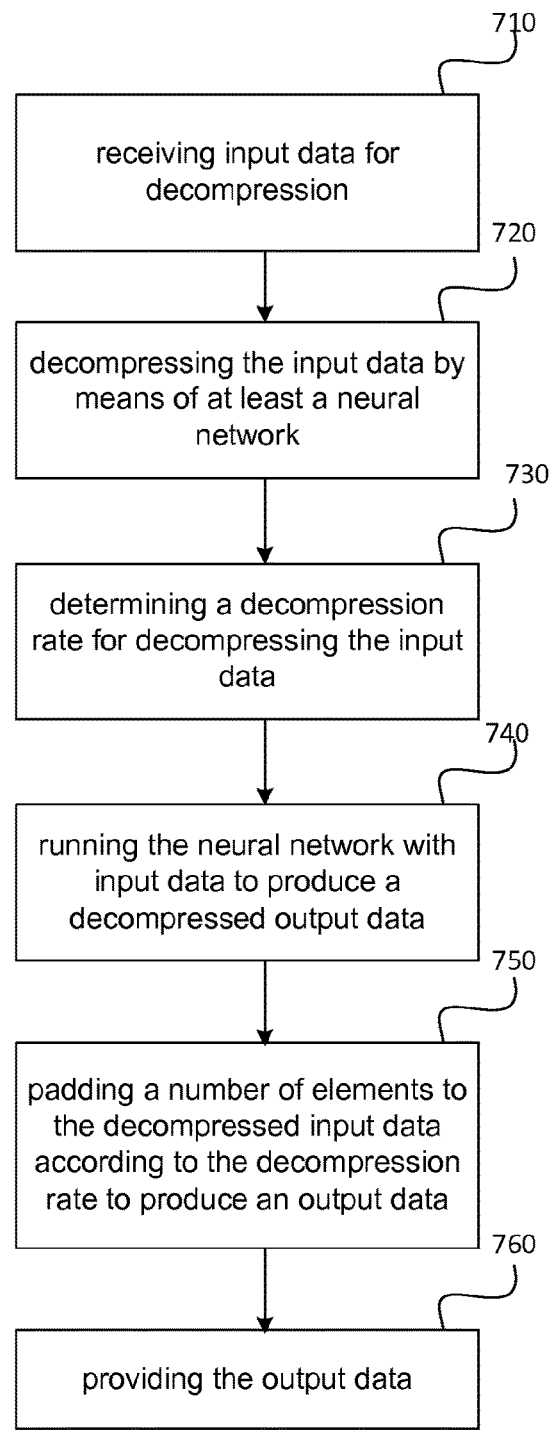
FIG. 7 is a flowchart illustrating a method according to another embodiment.

FIG. 7 is a flowchart illustrating a method according to an embodiment. A method comprises receiving 710 input data for decompression; decompressing 720 the input data by means of at least a neural network; determining 730 a decompression rate for decompressing the input data; running 740 the neural network with input data to produce a decompressed output data; padding 750 a number of elements to the decompressed input data according to the decompression rate to produce an output data; and providing 760 the output data.

An apparatus according to an embodiment comprises for compressing input data, wherein said means for compressing comprises at least a neural network; means for determining a compression rate for data compression; means for running the neural network with the input data to produce an output data; means for removing a number of elements from the output data according to the compression rate to result in a reduced form of the output data; and means for providing the reduced form of the output data and the compression rate to a decoder. The means comprises at least one processor, and a memory including a computer program code, wherein the processor may further comprise processor circuitry. The memory and the computer program code are configured to, with the at least one processor, cause the apparatus to perform the method of FIG. 6 according to various embodiments.

An apparatus according to an embodiment comprising means for receiving input data for decompression; means for decompressing input data by means of at least a neural network; means for determining a decompression rate for data decompression; means for running the neural network with input data to produce a decompressed input data; means for padding a number of elements to the decompressed output data according to the decompression rate to produce an output data; and means for providing the output data. The means comprises at least one processor, and a memory including a computer program code, wherein the processor may further comprise processor circuitry. The memory and the computer program code are configured to, with the at least one processor, cause the apparatus to perform the method of FIG. 7 according to various embodiments.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system, according to an embodiment, comprises compressing input data by means of at least a neural network; determining a compression rate for data compression; running the neural network with the input data to produce an output data; removing a number of elements from the output data according to the compression rate to result in a reduced form of the output data; and providing the reduced form of the output data and the compression rate to a decoder. A programmable operational characteristic of the system, according to another embodiment, comprises receiving input data for decompression; decompressing the input data by means of at least a neural network; determining a decompression rate for decompressing the input data; running the neural network with input data to produce a decompressed output data; padding a number of elements to the decompressed input data according to the decompression rate to produce an output data; and providing the output data.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. A method, comprising:
compressing input data by means of at least a neural network;

determining a compression rate for data compression;
running the neural network with the input data to produce an output data;
removing a number of elements from the output data according to the compression rate to generate a reduced form of the output data;
wherein the compression rate is associated with a mask, based on which the number of elements are removed; and
providing the reduced form of the output data and the compression rate to a decoder.

2. The method according to claim 1, wherein the neural network is trained with multiple masks associated with different compression rates.

3. The method according to claim 2, wherein each mask of the multiple masks include a pattern of N ones, and wherein N is different for each compression rate.

4. The method according to claim 3, wherein first N elements of a dimension of the reduced form of the output data are equal to one and the rest of that dimension are equal to zero.

5. The method according to claim 2, further comprising:
selecting N randomly from a uniform distribution during training.

6. The method according to claim 2, further comprising:
selecting N randomly from a non-uniform distribution emphasizing different compression rates or ranges of compression rates.

7. The method according to claim 2, further comprising:
training the neural network with different values of N, and averaging losses associated with the different values of N for a weight update.

8. A method comprising:
receiving input data for decompression;
decompressing the input data by means of at least a neural network;
determining a decompression rate for decompressing the input data;
running the neural network with the input data to produce a decompressed output data;
padding a number of elements to the decompressed output data according to the decompression rate to produce an output data;
wherein the decompression rate is associated with a mask, based on which the number of elements are padded; and
providing the output data.

9. An apparatus comprising:
at least one processor; and
at least one memory storing instructions that, when executed by the at least one processor, cause the apparatus at least to:
compress input data, wherein compression comprises at least a neural network;
determine a compression rate for data compression;
run the neural network with the input data to produce an output data;
remove a number of elements from the output data according to the compression rate to generate a reduced form of the output data;
wherein the compression rate is associated with a mask, based on which the number of elements are removed; and
provide the reduced form of the output data and the compression rate to a decoder.

10. The apparatus according to claim 9, wherein the neural network is trained with multiple masks associated with different compression rates.

11. The apparatus according to claim 10, wherein each mask of the multiple masks include a pattern of N ones, and wherein N is different for each compression rate.

12. The apparatus according to claim 11, wherein first N elements of a dimension of the reduced form of the output data are equal to one and the rest of that dimension are equal to zero.

13. The apparatus according to claim 10, wherein the at least one memory and the instructions are further configured to, with the at least one processor, further cause the apparatus to: select N randomly from a uniform distribution during training.

14. The apparatus according to claim 10, wherein the at least one memory and the instructions are further configured to, with the at least one processor, further cause the apparatus to: select N randomly from a non-uniform distribution emphasizing different compression rates or ranges of compression rates.

15. The apparatus according to claim 10, wherein the at least one memory and the instructions are further configured to, with the at least one processor, further cause the apparatus to: train the neural network with different values of N, and average losses associated with the different values of N for a weight update.

16. The apparatus according to claim 10, wherein the at least one memory and the instructions are further configured to, with the at least one processor, further cause the apparatus to: train the neural network with different values of N, and weight the losses based on an inverse frequency of elements a code that are not removed during training.

17. The apparatus according to claim 10, wherein the at least one memory and the instructions are further configured to, with the at least one processor, further cause the apparatus to: train the neural network with different values of N and have at least one fixed weight based on a value of N.

18. An apparatus comprising:
at least one processor; and
at least one memory storing instructions that, when executed by the at least one processor, cause the apparatus at least to:
receive input data for decompression;
decompress input data, wherein decompression comprises of at least a neural network;
determine a decompression rate for data decompression;
run the neural network with the input data to produce a decompressed output data;
pad a number of elements to the decompressed output data according to the decompression rate to produce an output data;
wherein the decompression rate is associated with a mask, based on which the number of elements are padded; and
provide the output data.

* * * * *